United States Patent
Schröder et al.

(10) Patent No.: US 6,882,948 B2
(45) Date of Patent: Apr. 19, 2005

(54) SPEED-DEPENDENT SETPOINT CORRECTION IN ELECTRICALLY REGULATED SLAVE DRIVES

(75) Inventors: Martin Schröder, Herzogenaurach (DE); Manfred Zäh, Forchheim (DE)

(73) Assignee: Siemens Aktiengesellschaft, Munich (DE)

(*) Notice: Subject to any disclaimer, the term of this patent is extended or adjusted under 35 U.S.C. 154(b) by 508 days.

(21) Appl. No.: 09/955,317

(22) Filed: Sep. 17, 2001

(65) Prior Publication Data

US 2002/0133244 A1 Sep. 19, 2002

(30) Foreign Application Priority Data

Feb. 2, 2001 (DE) .......................... 101 04 795

(51) Int. Cl.[7] .............................................. G06F 19/00
(52) U.S. Cl. .............................. 702/94; 702/85; 702/96; 700/61
(58) Field of Search ......................... 702/85–86, 89–91, 702/94, 96–97; 700/38, 61, 69, 70–71, 130

(56) References Cited

U.S. PATENT DOCUMENTS

| | | | |
|---|---|---|---|
| 3,686,956 A | * | 8/1972 | Simpkin et al. .............. 73/462 |
| 4,661,032 A | * | 4/1987 | Arai ........................... 700/260 |
| 4,792,788 A | * | 12/1988 | Kumar ......................... 341/15 |
| 4,906,908 A | * | 3/1990 | Papiernik et al. ........... 318/600 |

OTHER PUBLICATIONS

"Digitale Antriebe und SERCOS Interface" by Werner Phillip., In: Antriebstechnik 31 (1992), No. 12, pp. 30–38.

"Praxis der Fedorientiert Geregelten . . . " by Nguyen Phung Quang;, pp. 126–127.

* cited by examiner

*Primary Examiner*—Bryan Bui
(74) *Attorney, Agent, or Firm*—Baker Botts L.L.P.

(57) ABSTRACT

The system and method of the present invention is to drive a slave axis (S_A) with a value which indicates to said slave axis that the guide axis (L_A) has already rotated further than is actually the case. This can be achieved by adding a correction angle ($\phi_{corr}$) to the measured angle ($\phi_{L\_meas}$) of the guide axis. In order to configure the virtual onward rotation in such a way that a lag error of the slave axis is just compensated as a result, guide axis angles ($\phi_{L\_meas}$) are increased by respective correction angles ($\phi_{corr}$) which are proportional to the angular velocity ($\omega_L$) of the guide axis and weighted with the data propagation time ($T_T$) of the position measured value ($\phi_{L\_meas}$) of the guide axis and the delay ($T_R$) of the position control system of the slave axis, said correction angles ($\phi_{corr}$) preferably being dimensioned in accordance with $\phi_{corr} = \omega_L * (T_T + T_R)$.

14 Claims, 7 Drawing Sheets

SPEED-DEPENDENT SETPOINT CORRECTION IN ELECTRICALLY REGULATED SLAVE DRIVES

FIELD OF THE INVENTION

The invention relates to a setpoint correction method and control system for an electrically controlled or regulated slave axis which, in accordance with a predefined functional relationship, follows a guide movement of a higher-order guide axis.

BACKGROUND OF THE INVENTION

In many industrial machines, such as packaging and textile machines or sheet-fed offset printing machines, a plurality of movements have to be carried out regularly as a function of a central guide movement. The guide movement, which is carried out by a guide axis, is as a rule a cyclically repeated movement, for example the rotation of an axis. One general requirement for the guide movement is that lower-order movements which are carried out by the slave axes or follower axes follow the guide movement as exactly as possible in accordance with their predefinitions.

Classically, these are carried out by means of a mechanical construction, for example by means of cam disks, as they are known, or by a cam control system. In recent times, electronically regulated drives have been used both for the guide axis and for the slave axes, and dispensing with the positive mechanical coupling. One may speak of this as an electronic transmission. The measurement of the guide axis movements is in this case mostly carried out by means of a rotary encoder. The desired angles for the regulation of the slave axes are determined as a function of the measured guide axis angles.

The illustration according to FIG. 2 shows a block diagram for generating the slave axis setpoints in the conventional manner outlined. An electrically driven guide axis L_A changes its position by assuming various position angles $\phi_L$, which are registered by a rotary encoder WG. This supplies position measured values $\phi_{L\_meas}$, with which a function block F is driven which describes the geometric relationship between the movements $\phi_{L\_meas}$ of the guide axis L_A and the desired movements $\phi_{S\_sp}$ of the follower axis or slave axis S_A. This can be carried out in the form of a mathematical function $\phi_{S\_sp}=f(\phi_{L\_meas})$ or else, for example, by means of a table, in which pairs of values are deposited which represent corresponding locational positions between the guide axis and the slave axis. Using the position setpoints $\phi_{S\_sp}$ generated by the function block F on the output side, the slave axis S_A is finally driven.

Using electronic drives as described above and shown in FIG. 2, the actual angles $\phi_{S\_act}$ of the slave axes always lag behind their setpoints $\phi_{S\_sp}$, since each position control system is afflicted with a specific delay. The difference between the position setpoint $\phi_{S\_sp}$ and the position measured value $\phi_{S\_act}$ is referred to as the lag error. If, for example, a bus system is used for the transmission of the measured guide axis measured values to the slave axes, then the lag error increases again because of the transport time on the bus. The latter is also true for those slave axes which are not regulated but merely controlled.

SUMMARY OF THE INVENTION

The object of the present invention consists in providing a setpoint correction method and a corresponding control system which effectively avoids lag errors on the part of slave axes. According to the present invention, this object is achieved for a controlled slave axis by the method described hereinabove and further by increasing a position measured value of the guide axis for driving the slave axis by a position correction value which is dimensioned proportionally to the speed of the guide axis, with this speed being assumed to be substantially constant during a data propagation time of the position measured value of the guide axis.

For a regulated slave axis, the object of this invention is likewise achieved by the method described at the outset and further by increasing a position measured value of the guide axis for driving the slave axis by a position correction value which is dimensioned proportionally to the speed of the guide axis, wherein the speed is assumed to be substantially constant during a data propagation time of the position measured value of the guide axis and a delay of the position control system of the slave axis.

The foregoing is preferably carried out in such a way that respective position correction values are always dimensioned such that just a lag error of the slave axis is compensated. If a rotary encoder connected to the guide axis supplies guide axis angles, then the present invention is preferably carried out for a controlled slave axis by increasing the guide axis angles by respective correction angles which are proportional to the angular velocity of the guide axis and weighted with the data propagation time of the position measured value of the guide axis. The correction angles are dimensioned in accordance with the equation:

$$\phi_{corr}=\omega_L * T_T$$

In an electrically regulated slave axis, this is carried out by increasing the guide axis angles by respective correction angles which are proportional to the angular velocity of the guide axis and weighted with the data propagation time of the position measured value of the guide axis and the delay of the position control system of the slave axis. The correction angles are here dimensioned in accordance with the equation:

$$\phi_{corr}=\omega_L * (T_T+T_R)$$

In this case, it has proven to be beneficial in both cases if the angular velocity of the guide axis is determined by differentiating the guide axis angles.

A particularly preferred method according to the present invention is if the guide axis and the slave axis communicate via a bus system, with the data propagation time representing the transmission time of the position measured values of the guide axis via the data bus. Furthermore, it is preferred where the object of the invention is achieved by a control system for generating and correcting setpoints for driving a slave axis which, in accordance with a predefined functional relationship, follows a guide movement of a higher-order guide axis which is equipped with a means of registering respective position measured values of the guide axis. To effect this purpose, it is preferred to utilize a means of generating and applying position correction values to respective position measured values, it being possible for the position correction values to be determined in such a way that these are dimensioned proportionally to the speed of the guide axis. The speed of the guide axis is in this case assumed to be substantially constant during a data propagation time of the position measured value of the guide axis and/or a delay of a position control system of the slave axis.

The control system according to the present invention is distinguished, inter alia, by the fact that respective position correction values can always be determined in such a way that a lag error of the slave axis can be compensated. A particularly cost-effective embodiment of such a control system uses a rotary encoder to supply guide axis angles as the means of registering position measured values of the guide axis. It has additionally proven to be advantageous if guide axis angles registered in this way can be increased by respective correction angles which are proportional to the angular velocity of the guide axis and weighted with the data propagation time of the position measured value of the guide axis. It is possible for these correction angles to be dimensioned in accordance with the equation:

$$\phi_{corr} = \omega_L * T_T$$

Similarly, to compensate for regulation delays, registered guide axis angles can be increased by respective correction angles which are proportional to the angular velocity of the guide axis and weighted with the delay of the position control system of the slave axis. It is possible for said correction angles to be dimensioned in accordance with the equation:

$$\phi_{corr} = \omega_L * T_R$$

Furthermore if a means of differentiating the guide axis angles is provided, then the angular velocity of the guide axis can be derived particularly simply and effectively.

Compensating lag errors with a control system according to the present invention is suitable to a particular extent if a bus system is provided via which the guide axis and the slave axis communicate. In this case, the data propagation time then represents the transmission time of the position measured values of the guide axis via the data bus.

BRIEF DESCRIPTION OF THE INVENTION

Further advantages and details of the present invention are described in the context of the preferred embodiment presented below and in conjunction with the Figures in which.

DETAILED DESCRIPTION OF THE INVENTION

The present invention essentially consists in driving the slave axis with a value which indicates that the guide axis has already rotated further than is actually the case. This can be achieved by adding a correction angle $\phi_{corr}$ to the measured angle $\phi_{L\_meas}$ of the guide axis L_A. One difficulty is to configure the virtual onward rotation in such a way that just a lag error of the slave axis S_A is compensated as a result.

At a low guide axis rotational speed $\omega_L$ a measured value transport propagation time $T_T$, for example on a data bus between the guide axis and the control system of the slave axis, has only a slight effect, whilst the guide axis at a high rotational speed continues to rotate through a comparatively large angle during the transport propagation time. The angular error produced in this way is:

$$\varphi_{transport\ error} = \int_{T_T} \omega_L dt \quad (1)$$

As a rule, the angular velocity $\omega_L$ of the guide axis L_A can be viewed as being approximately constant during the transport time $T_T$. It therefore follows that:

$$\phi_{transport\ error} = \omega_L \cdot T_T \quad (2)$$

It has now been found that the angular error by which the measured guide axis angle must be increased is proportional to the angular velocity of the guide axis. Since this is similarly true for a delay $T_R$ of a slave axis control system, the overall correction angle is given as $$\phi_{corr} = \omega_L * (T_T + T_R) \quad (3)$$

Figure 1:
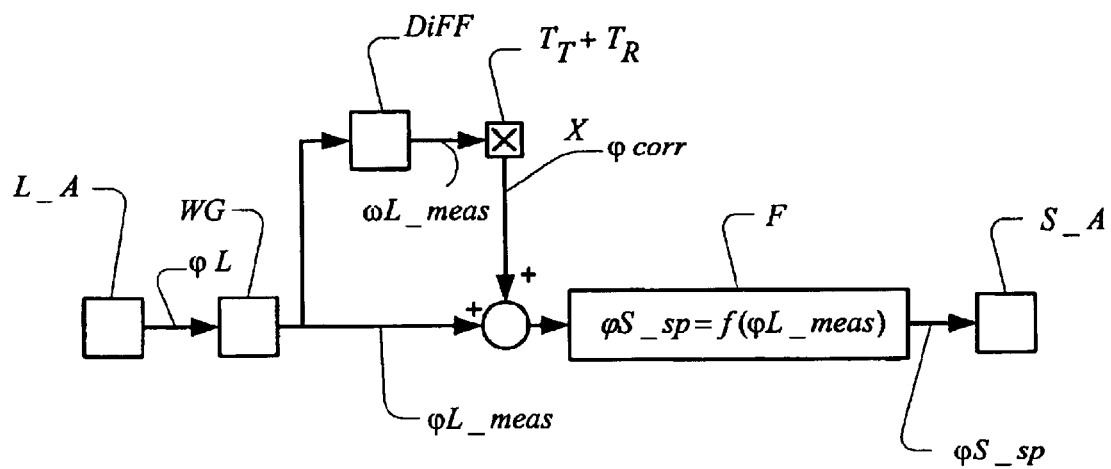
FIG. 1 shows a block diagram of a structure for generating slave axis setpoints with compensation according to the inventive of lag errors of the slave axis.

In the case of the machine on which FIG. 1 is based, the transport time $T_T$ of the guide axis measured value $\phi_{L\_meas}$ is known. The delay time of the slave axis position control system $T_R$ can be determined experimentally. The angular velocity may be obtained, as discussed below, from the measured guide axis measured angle $\phi_{L\_meas}$ by means of differentiation. Therefore, all the variables in the above equation are known, so that the correction angle $\phi_{corr}$ can be calculated. The block diagram according to FIG. 1 shows such a generation of the slave axis setpoints with the expansion according to the invention to compensate the lag error.

Figure 2:
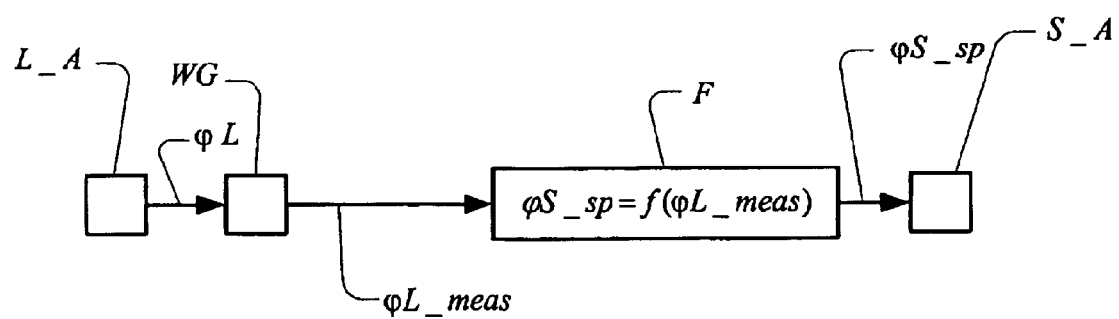
FIG. 2 shows a block diagram of a conventional structure for generating slave axis setpoints.

FIG. 2 illustrates further elements for lag error compensation.

Before driving the unit F for describing the functional relationship between the guide axis L_A and the slave axis S_A, respective correction angles are added (+) to the measured position measured values ($\phi_{L\_meas}$ in accordance with the calculation rule (3). To this end, first of all the respective position measured value $\phi_{L\_meas}$ is differentiated in a computing unit DIFF, by which means the corresponding angular velocity $W_{L\_meas}$ of the guide axis L_A is obtained.

In a multiplication unit X, this respective angular velocity is multiplied by the sum of the data propagation time $T_T$ of the position measured value $\phi_{L\_meas}$ of the guide axis L_A and the delay $T_R$ of the position control system of the slave axis S_A, which results in the correct correction angle $\phi_{corr}$.

Figure 3:
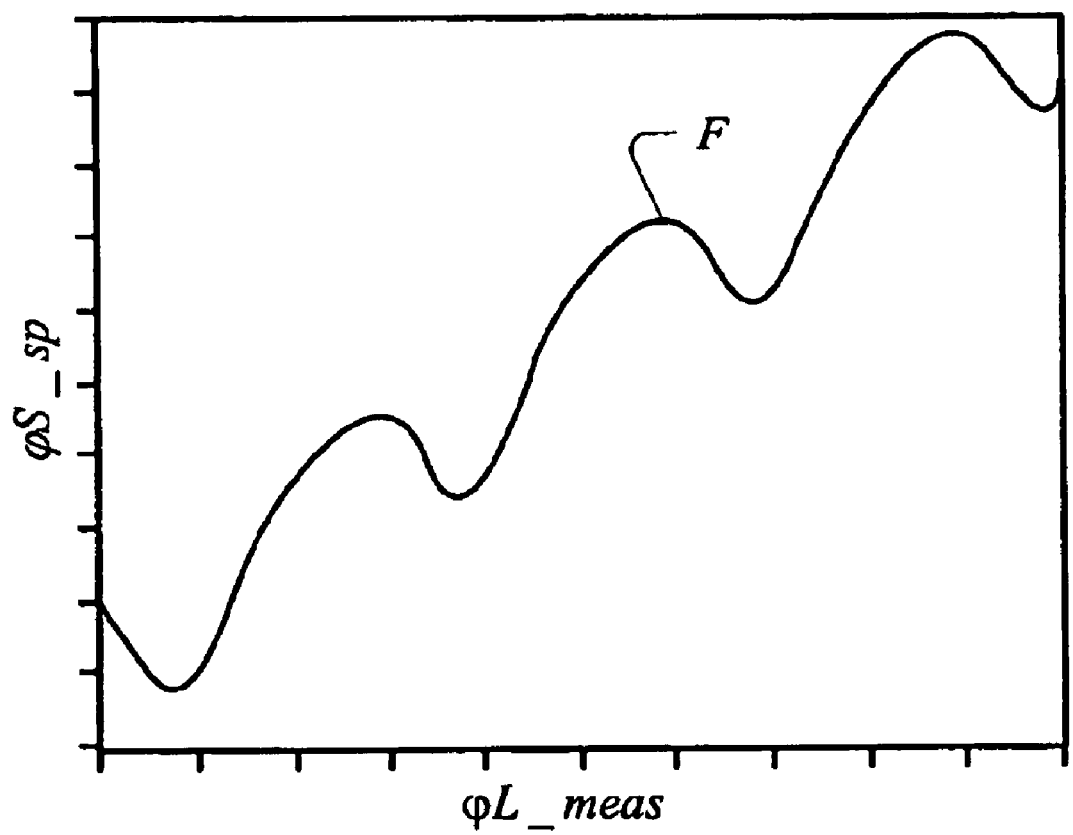
FIG. 3 shows a possible geometric relationship between a guide axis and a slave axis, using the example of a carding machine from the textile industry.

The illustration according to FIG. 3 now shows, by way of example, the basic relationship between the movements of the guide axis L_A and slave axis S_A as a mathematical function $\phi_{S\_sp} = f(\phi_{L\_meas})$ in the case of a carding machine from the textile industry. For this purpose, the appropriate position setpoints $\phi_{S\_sp}$ of the slave axis are plotted against the associated position measured values $\phi_{L\_meas}$ of the guide axis. The result is a polynomial waveform with a number of local maxima and minima.

Figure 4:
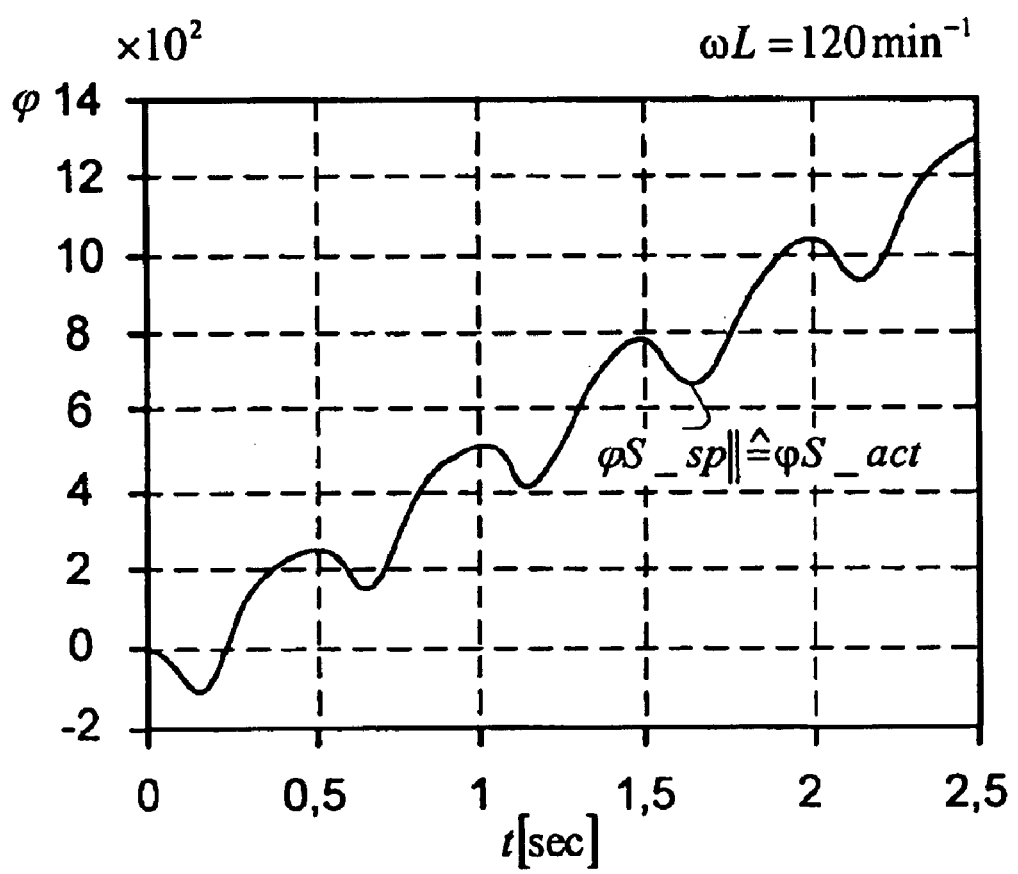
FIG. 4 shows a comparison between the variation over time of the setpoint and measured value of the slave axis for the functional relationship shown in FIG. 3, using a simulation with the conventional arrangement shown in FIG. 2 at a guide axis rotational speed of 120 rev/min.
Figure 5:
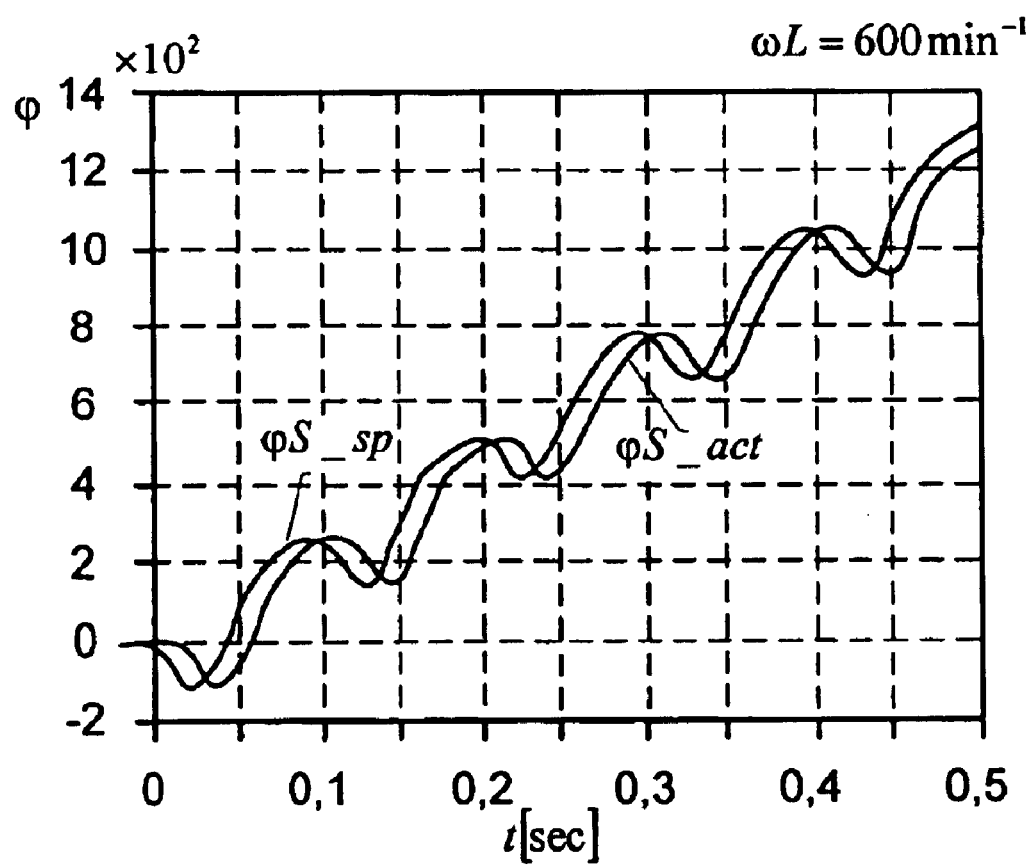
FIG. 5 shows the same comparison as in FIG. 4 at a guide axis rotational speed of 600 rev/min.

FIG. 4 and FIG. 5, the simulated variation over time resulting from the functional relationship according to FIG. 3 is shown in the form of a comparison between slave axis setpoints $\phi_{S\_sp}$ and slave axis actual values $\phi_{S\_act}$ over time t at two constant angular velocities $\omega_L$ for the case in which no correction of the measured guide axis angle is carried out. FIG. 4 shows this relationship at a guide axis rotational speed $\omega_L$=120 rev/min, while in FIG. 5, a guide axis rotational speed $\omega_L$=600 rev/min is used as a basis. It can clearly be seen that the actual value $\phi_{S\_act}$ is able to follow the setpoint $\phi_{S\_sp}$ significantly less well at the higher guide axis rotational speed, that is to say that the lag error is considerably greater.

Figure 6:
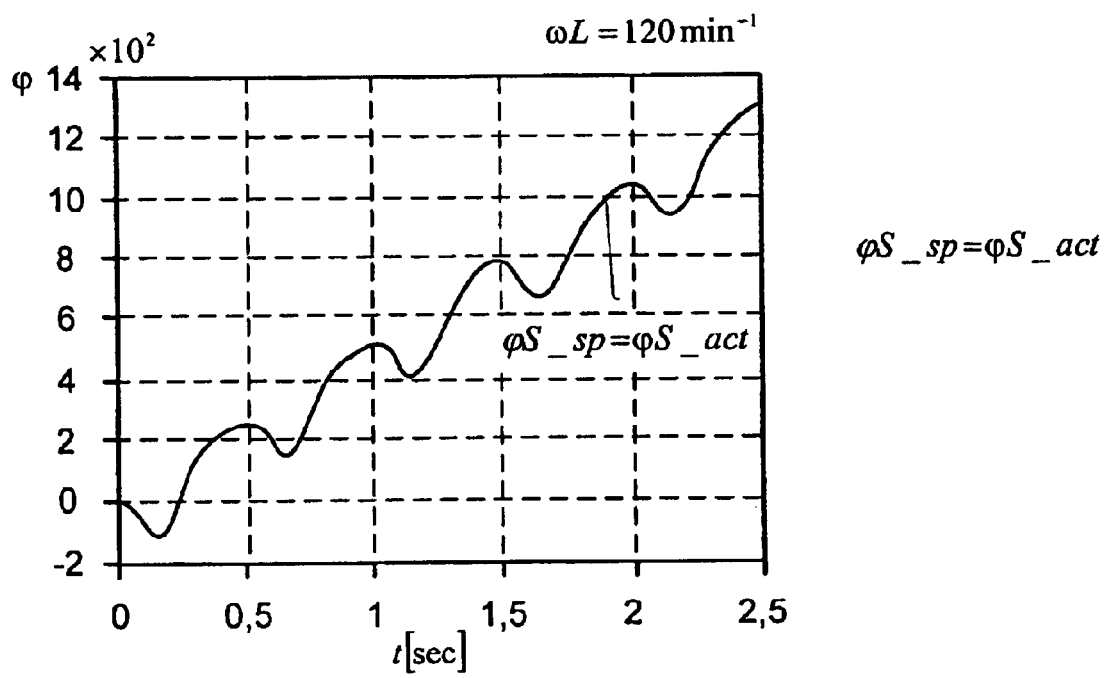
FIG. 6 shows the comparison shown in FIG. 4 at a guide axis rotational speed of 120 rev/min, but with the arrangement according to the invention according to FIG. 1.
Figure 7:
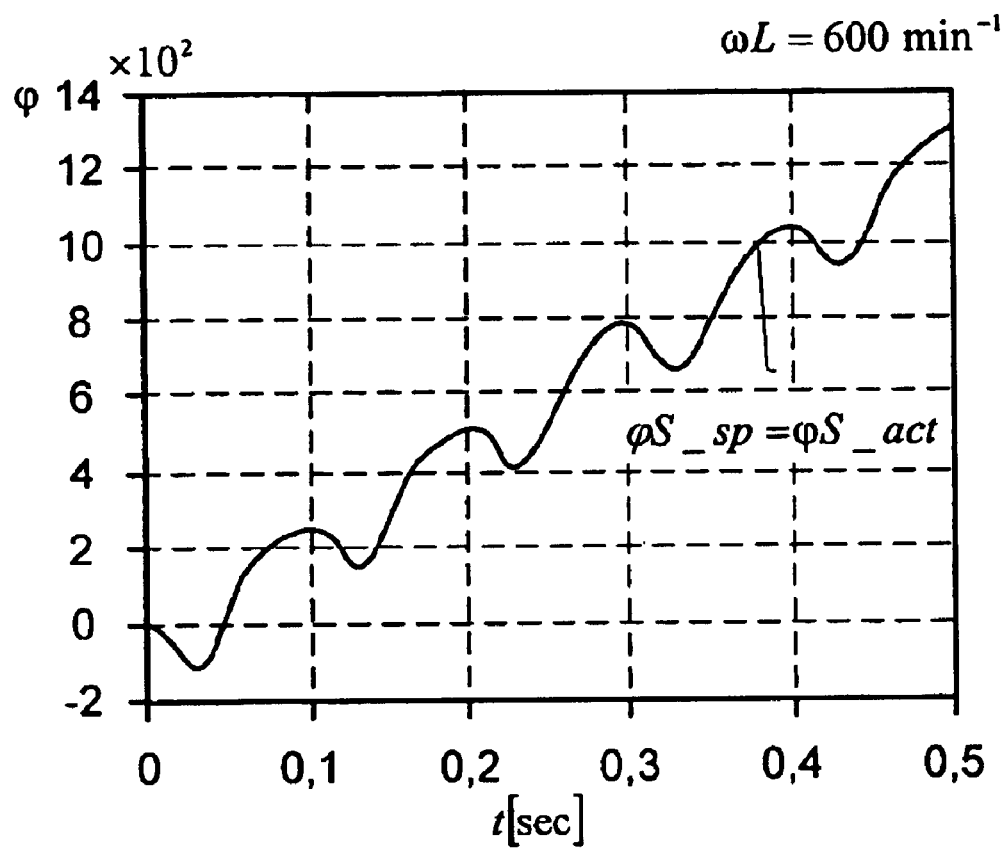
FIG. 7 shows the comparison shown in FIG. 5 at a guide axis rotational speed of 600 rev/min, but with the arrangement according to the invention according to FIG. 1.

For comparison, FIG. 6 (guide axis rotational speed $\omega_L$=120 rev/min) and FIG. 7 (guide axis rotational speed $\omega_L$=600 rev/min) show the same waveforms when the expansion according to the present invention is used to compensate the lag error. At both rotational speeds, the agreement between the slave axis setpoints $\phi_{S\_sp}$ and slave axis actual values $\phi_{S\_act}$ is significantly better than without the expansion according to the invention to compensate the lag error. Of particular importance is the considerable improvement at higher rotational speeds, since the machines are operated in this range in order to achieve high productivity.

We claim:

1. A setpoint correction method for an electrically controlled slave axis which, in accordance with a predefined functional relationship follows a guide movement of a higher-order guide axis comprising the steps of:
   increasing a position measured value of the guide axis for driving the slave axis by a position correction value which is determined proportionally to the guide axis's speed, and
   determining a constant value for said guide axis's speed during a data propagation time of the position measured value of the guide axis.

2. A setpoint correction method for an electrically regulated slave axis which, in accordance with a predefined functional relationship follows a guide movement of a higher-order guide axis comprising the steps of:
   increasing a position measured value of the guide axis for driving the slave axis by a position correction value which is determined proportionally to the guide axis's speed, and
   determining a constant value for said guide axis's speed during a data propagation time of the position measured value of the guide axis and a delay of a position control system of the slave axis.

3. The setpoint correction method according to claim 1 or 2, wherein the position correction value is determined so as to compensate for a lag error of the slave axis.

4. The setpoint correction method according to claim 1, further comprising connecting a rotary encoder to the guide axis supplying a guide axis angle and increasing said guide axis angle by a correction angle which is proportional to the guide axis's angular velocity and weighted with the data propagation time of the position measured value of the guide axis said correction angle being determined as follows: $\phi_{corr}=\omega_L*T_T$, wherein $\phi_{corr}$ is the position correction value, namely a correction angle, $\omega_L$ is the speed of the guide axis, namely an angular velocity and $T_T$ is the data propagation time.

5. The setpoint correction method according to claim 1 or 2, further comprising using a busy system to enable the guide axis and the slave axis to communicate, and wherein the data propagation time represents the transmission time of the position measured values of the guide axis via a data bus.

6. The setpoint correction method according to claim 2, further comprising connecting a rotary encoder to the guide axis supplying a guide axis angle and increasing said guide axis angle by a correction angles which is proportional to the angular velocity of the guide axis and weighted with the data propagation time of the position measured value of the guide axis and a delay of the position control system of the slave axis, said correction angle being determined as follows: $\phi_{corr}=\omega_L*(T_T+T_R)$, wherein $\phi_{corr}$ is the position correction value, namely a correction angle, $\omega_L$ is the speed of the guide axis, namely an angular velocity, $T_T$ is the data propagation time, and $T_R$ is the delay.

7. The setpoint correction method according to claim 3 or 5, further comprising determining the angular velocity of the guide axis by differentiating guide axis angles.

8. A control system for generating and correcting setpoints for driving a slave axis which, in accordance with a predefined functional relationship follows a guide movement of a higher-order guide axis comprising a register for registering position measured values of the guide axis, said register generating and applying position correction values to position measured values wherein the position correction values are determined proportionally to the guide axis's speed, wherein a constant value of said guide axis's speed is used during a data propagation time of the position measured value of the guide axis and/or a delay of a position control system of the slave axis.

9. The control system according to claim 8, wherein position correction values are determined so as to compensate for a lag error of the slave axis.

10. The control system according to claim 8, wherein the register is a rotary encoder which supplies guide axis angles.

11. The control system according to claim 10, wherein registered guide axis angles can be increased by correction angles which are proportional to the guide axis's angular velocity and weighted with the data propagation time of the position measured value of the guide axis, said correction angles to be determined as follows: $\phi_{corr}=\omega_L*T_T$.

12. The control system according to claim 10, wherein registered guide axis angles can be increased by correction angles which are proportional to an angular velocity of the guide axis and weighted with the delay of the position control system of the slave axis, it being possible for said correction angles to be determined as follows: $\phi_{corr}=\omega_L*T_R$.

13. The control system according to claim 8, further differentiating the guide axis angles and wherein an angular velocity of the guide axis can be derived.

14. The control system according to claim 8, further comprising a bus system by which the guide axis and the slave axis communicate, and wherein the data propagation time represents the transmission time of the position measured values of the guide axis via a data bus.

* * * * *